United States Patent
Bloomfield et al.

(10) Patent No.: US 6,780,288 B1
(45) Date of Patent: Aug. 24, 2004

(54) PROCESS FOR THE MANUFACTURE OF CONCENTRATED SOLUTIONS

(75) Inventors: Stephen Bloomfield, Tervuren (BE); Graham E. Williams, St. Helens (GB)

(73) Assignee: Solvay S.A., Brussels (BE)

( * ) Notice: Subject to any disclaimer, the term of this patent is extended or adjusted under 35 U.S.C. 154(b) by 230 days.

(21) Appl. No.: 09/679,646

(22) Filed: Oct. 5, 2000

(30) Foreign Application Priority Data

Oct. 5, 1999 (EP) .............................. 99307848

(51) Int. Cl.[7] .............................. B01D 1/22; B01D 3/28; C01B 15/013
(52) U.S. Cl. .............................. 203/12; 159/49; 203/72; 203/73; 423/584
(58) Field of Search .............................. 159/43.1, 49, 18, 159/13.1, DIG. 19; 203/72, 73, 12, 100, 58, DIG. 8; 202/154, 155, 237, 259; 423/584

(56) References Cited

U.S. PATENT DOCUMENTS

| | | | | |
|---|---|---|---|---|
| 2,895,886 A | | 7/1959 | Scneider | |
| 3,714,342 A | * | 1/1973 | Kabisch | 423/588 |
| 3,856,632 A | * | 12/1974 | Peter | 203/11 |
| 4,009,188 A | * | 2/1977 | Heim et al. | 549/531 |
| 4,328,074 A | * | 5/1982 | Standiford | 203/19 |
| 5,964,986 A | | 10/1999 | Meili | |
| 6,252,125 B1 | * | 6/2001 | Porscha | 570/246 |
| 6,290,820 B1 | * | 9/2001 | Carden | 203/49 |

FOREIGN PATENT DOCUMENTS

| | | | |
|---|---|---|---|
| CN | 85103225 | * | 4/1985 |
| EP | 0 835 680 A1 | | 4/1998 |
| EP | 0 933 107 A1 | | 8/1999 |
| GB | 590439 | | 7/1947 |
| GB | 668874 | | 3/1952 |

* cited by examiner

*Primary Examiner*—Virginia Manoharan
(74) *Attorney, Agent, or Firm*—Stites & Harbison PLLC; B. Aaron Schulman

(57) ABSTRACT

Process for the manufacture of a concentrated solution, like a concentrated aqueous hydrogen peroxide solution, by distillation and evaporation of a dilute solution, in which the distillation and the evaporation are carried out in two distinct pieces of equipment which are easy to dismantle and to transport. Aqueous hydrogen peroxide solutions having a concentration of at least 90% are obtainable.

9 Claims, 1 Drawing Sheet

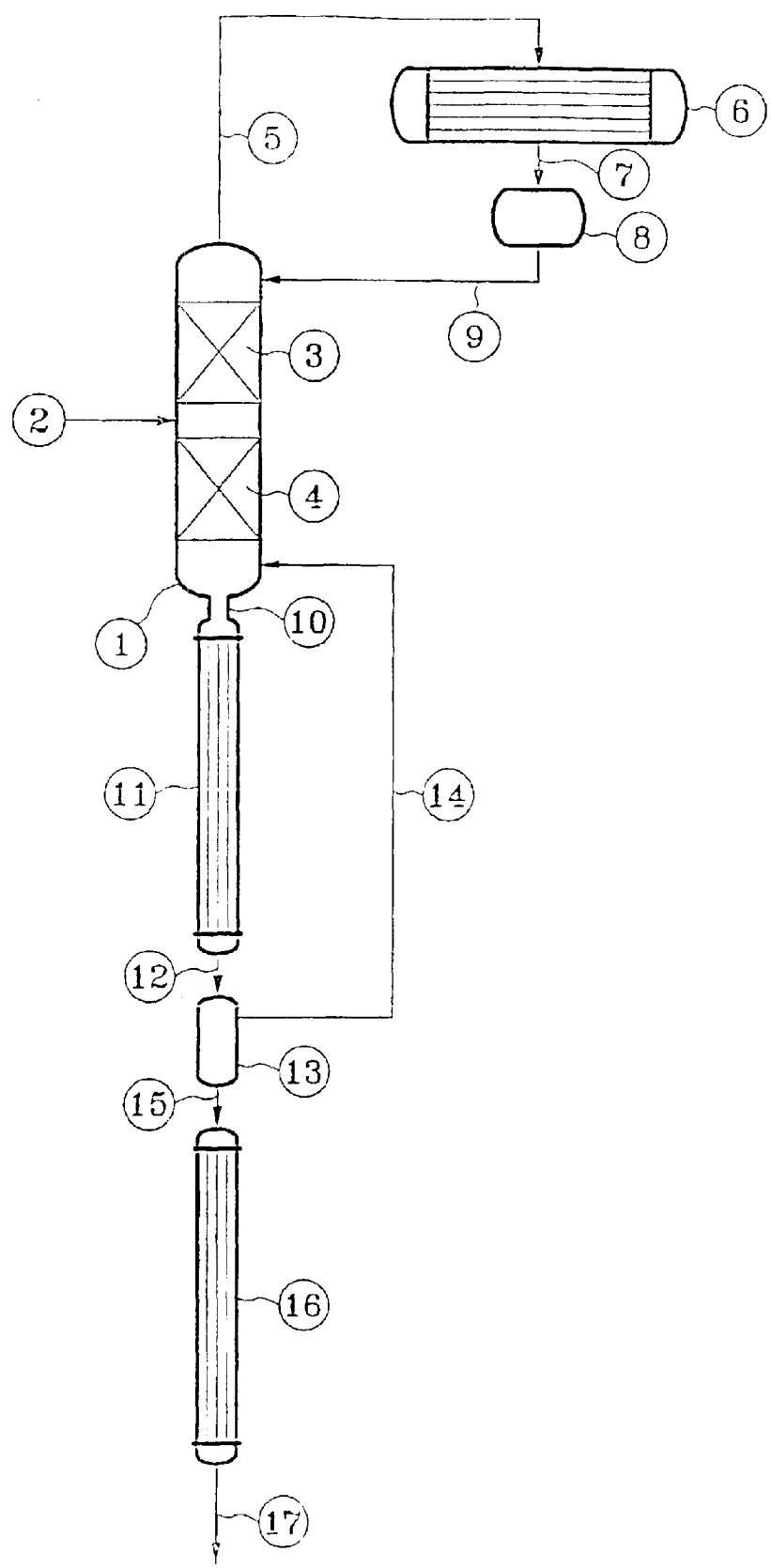

PROCESS FOR THE MANUFACTURE OF CONCENTRATED SOLUTIONS

FIELD OF THE INVENTION

This invention relates to a process for the manufacture of concentrated solutions in safe and economical conditions, using an apparatus which is easy to dismantle and to transport. The invention also relates to the use of the process of the present invention to produce concentrated hydrogen peroxide solutions, and to these concentrated hydrogen peroxide solutions.

BACKGROUND OF THE INVENTION

It is known that some c solutions, like concentrated hydrogen peroxide solutions, can be made to explosively decompose. Known processes for the manufacture of such concentrated solutions mostly start from diluted solutions and use evaporation and/or distillation techniques. Since the energy required for the detonation decreases when temperature and/or concentration increases, the probability of an explosive decomposition increases with increasing temperature and/or concentration, and is therefore critical during concentration processes. Furthermore, the magnitude of such potential explosions depends on the build-up of concentrated solution, which are therefore critical in the apparatus used in concentration processes.

The final concentration obtainable by such processes is usually limited not only because of the already mentioned safety hazards but also because of the thermodynamic limit of some processes, the pressure and temperature conditions being dependent on the design of the equipment and more particularly, on the design of the distillation column.

Moreover, the costs in investment and/or energy consumption of such known processes are high.

And finally, the known installations used therefor are often operating under vacuum. Consequently, their assembling and tightness is critical and may constitute a problem if the apparatus is intended to be dismantled and/or transported. In the case of concentrated hydrogen peroxide solutions for instance, it is very convenient to have the concentration apparatus near the site where it is used, in order to avoid the danger of transporting the concentrated solution.

Some of the known processes solve one or more of the above mentioned problems, but none of them solves them all.

GB 668874 relates to a process for the manufacture of high concentrated hydrogen peroxide solutions by distillation of diluted solutions, where the high boiling fraction resulting from the distillation is vaporized in two superposed pans. The drawback of this process is that it operates with at least two horizontal layers of liquid. The pressure drop induced by these layers increases the boiling temperature of the liquid, thereby increasing the probability of explosive decomposition. In addition, these horizontal liquid layers result in liquid build-ups in the area where the concentration of the solution is the highest. Another drawback of the process according to GB 668874 is the high heat consumption of the vaporizer.

EP 835680 relates to a distillation column consisting of at least one packed section and an evaporator on a same vertical axis, and which comprises at least two evaporators and/or two condensers. This kind of apparatus, using either two evaporators and/or two condensers, is complicated and expensive. Besides, it doesn't provide means for avoiding the accumulation of concentrated solution. Therefore, it is preferably applied to produce solutions limited to a concentration of 70%. Moreover, it is very difficult to dismantle and/or transport.

SUMMARY OF THE INVENTION

The present invention is aimed at overcoming the disadvantages of the known processes by providing a process for the manufacture of a concentrated solution in safe and economical conditions, using an apparatus being easy to dismantle and transport near to the place where the concentrated solution is used.

To this end, the invention relates to a process for the manufacture of a concentrated solution from a dilute solution, in which the distillation and the evaporation are carried out in a distillation column and in an evaporator which constitute two distinct pieces of equipment which are easy to dismantle and to transport.

The fact that the pieces of equipment are distinct means that they both include a bottom and a top through which fluids can flow, and that they are able to function separately.

The main advantage of using two distinct pieces of equipment for the distillation column and the evaporator is that the complete apparatus is easier to dismantle and to transport than when one single column is used. The use of two distinct pieces of equipment surprisingly didn't lead to problems arising from the accumulation of liquids which were expected to arise in the connecting pieces, especially if they contain reduced area portions.

In a preferred embodiment of the present invention, the connection between the distillation column and the evaporator is made through a distributor which has a cross-sectional area at is narrowest point which is smaller than the cross-sectional area of the distillation column.

The cross-sectional area of the distillation column is calculated as being the average cross-sectional area of the horizontal sections in the effective packed section of the column, excluding the above mentioned bottom and top.

The distributor according to the invention may be any known kind of liquid distributor which enables the formation of a thin film of liquid along the walls of the falling film evaporator, provided that is has the geometric requirement stated above. Good results have been obtained with a distributor having a bigger cross-sectional area at one end and a smaller cross-sectional at the other end. In that case, the biggest cross-sectional area is connected to the distillation column, while the smallest one is connected to the falling film evaporator.

Preferably, the distillation column and the evaporator are assembled in a way that allows the liquid to flow from the distillation column to the evaporator through the distributor under the action of gravity only.

More preferably, the distillation column is assembled on top of the evaporator, the axes of both pieces of equipment being aligned.

The process according to the invention preferably uses a feeding device at one or more points along the distillation column. This feeding device is for instance located in the upper $\frac{2}{3}$ of the column.

The distillation column may be filled with an appropriate number of fractionating devices or packings. These devices may be chosen from the various fractionating devices which are known per se in the technology of distillation columns, such as, for example, perforated trays, valve trays, bubble cap trays and various packings such as, for example, Raschig rings, Pall rings and woven mats. Structured packing such as, for example, structured packing-SULZER® BX type, is preferred.

Vertical surfaces are preferred inside the distillation column, in order to limit liquid build-up. The bottom of the column is preferably also designed to avoid any liquid buildup.

In another advantageous embodiment of the present invention, the evaporator is a falling film evaporator. The falling film evaporator according to this embodiment is generally a long tube vertical evaporator in which the concentrated solution leaving the bottom of the distillation column is fed continuously to the top of the tube(s) and flows down the walls as a film. The number and the dimension of the tubes are such that the hold-up of hydrogen peroxide in the evaporator is minimized.

Preferably, the process according to the invention uses a heating device for the falling film evaporator, in which hot water is circulating.

The process according to the invention may also use a cooler and a distributor for connecting the falling film evaporator to the cooler. The cooler is preferably a falling film cooler. It can be cooled by any medium commonly used for heat transfer. Preferably, the cooling medium is water and/or ethylene glycol.

The materials of construction of all parts of this apparatus must be fully compatible with the solutions for as far as corrosion and stability of the product are concerned. Aluminium, glass and fluoropolymers are preferred materials.

The process according to the invention may be used for the production of any concentrated solution. It is particularly suited for the production of concentrated aqueous hydrogen peroxide solutions, especially in concentrations of at least 80% by weight, in particular at least 90%. Usually, the concentrations are at most 98% by weight.

According to a preferred embodiment of the present invention, the process comprises the following steps:

(a) feeding the diluted solution at one or more points along the distillation column;

(b) distilling the diluted solution in the distillation column so as to obtain a low boiling vapor fraction of the solution at the top of the distillation column and a high boiling liquid fraction of the solution at the bottom of the column;

(c) transferring, through the distributor, the high boiling liquid fraction of the solution from the bottom of the distillation column into the evaporator, which is a falling film evaporator, (d) concentrating the high boiling liquid fraction of the solution in the falling film evaporator; and (e) collecting the concentrated solution at the bottom of the falling film evaporator.

The feed point of the diluted solution usually separates a stripping or washing section of packing below the feed point, from a rectification or enriching section of packing above the feed point.

In the process according to the invention, there is preferably no recirculation of liquid.

The distillation is mostly carried out under reduced pressure in order to limit the boiling temperature of the high boiling liquid fraction which has to be vaporized. In general, the pressure is lower than 40 Torr. A maximum pressure of 10 Torr during the distillation is well suited. The pressure during the distillation is generally higher than about 5 Torr.

A minimal pressure of 3 Torr is mostly observed during the distillation. Usually, the temperature at the bottom of the distillation column is less than 50° C. A bottom temperature of less than 40° C. is more suitable. Generally, the bottom temperature will be higher than 0° C.

As explained above, in the falling film evaporator according to the invention, the number and the dimension of the tubes are such that the build-up of liquid in the evaporator is minimized. Typically, less than 2% of the hourly production of hydrogen peroxide is held up in the evaporator. Preferably, less than 1% of the hourly production is held up in the evaporator. Safety is increased when less than 0.5% of the hourly production of concentrated liquid is held up in the falling film evaporator.

The falling film evaporator according to the invention is heated by a heating medium. This may be any medium commonly used for heat transfer. For example, this medium may be hot water or vapor which is circulating into the evaporator. Advantageously, it is hot water. Usually, the evaporator is heated at maximum 20° C. above the evaporating temperature of the high boiling liquid fraction resulting from the distillation. Preferably, it is only heated up to 10° C. above that temperature.

In the falling film evaporator according to the invention, the high boiling liquid fraction of the solution flows down by gravity, and the flow of the heating medium and the flow of vapor arising from the solution may either be flowing down or up. Preferably, circulation of hot water is used as heating medium and the hot water, the high boiling liquid fraction of the solution and the vapor arising from it are flowing down concurrently.

The concentrated solution leaving the falling film evaporator is advantageously cooled before storage or use. To this end, it may be transferred to a cooler. This transfer may be operated by gravity through a distributor. The cooler to which is transferred the concentrated solution is preferably a falling film cooler. The cooler can be cooled by any medium commonly used for heat transfer. Preferably, the cooling medium is water and/or ethylene glycol. In the cooler, the concentrated solution is usually cooled below 15° C. It is preferably cooled to about 0° C.

The concentrated solution according to the invention consists of a concentrated solution of a compound in a solvent which has a lower boiling point than this compound. This compound may be unstable at high temperature and/or at high concentration in the solvent. Generally, the solvent is water. Hydrogen peroxide is an unstable product perfectly suited for the process according to the invention. Accordingly, the invention is particularly suited for concentrated aqueous hydrogen peroxide solutions.

The diluted aqueous hydrogen peroxide solution fed to the rectification column usually contains up to 70% w/w of hydrogen peroxide, but it may contain up to 86% w/w of hydrogen peroxide. This diluted hydrogen peroxide solution preferably contains only traces of organic material and metals. Typically, it contains less than 100 mg/kg of organic material. The metal content of this diluted solution is preferably less than 1 mg/kg. Such a pure hydrogen peroxide solution may be obtained by any known purification process. It may for instance be obtained by a double distillation process. This consists of a first distillation to a concentration of 70% for example, then of a dilution with demineralised water and finally, of a second distillation to get the required concentration.

The concentrated hydrogen peroxide solution resulting from the evaporation of the high boiling liquid fraction in the falling film evaporator usually contains at least 80% w/w hydrogen peroxide. It may contain up to 90% w/w hydrogen peroxide. A hydrogen peroxide concentration of 98% is also obtainable by the process according to the invention. In some cases, even a 100% w/w concentrated hydrogen peroxide solution can be obtained.

Concentrations of hydrogen peroxide above 90% w/w were not commercially available up till now because of the hazards involved in their production. Accordingly, the present invention also relates to concentrated aqueous hydrogen peroxide solutions obtainable by the process described hereabove and having a concentration of at least 90% w/w.

BRIEF DESCRIPTION OF THE DRAWINGS

FIG. 1 is a diagrammatic representation of a preferred embodiment of the apparatus according to the invention.

DETAILED DESCRIPTION OF THE DRAWINGS

The process according to the invention is further detailed in the description which follows and which refers to FIG. 1.

The distillation column (1) consists of a packed column (structured packing-SULZER®BX type) working under vacuum. The choice of this packing allows a low pressure drop per theoretical stage of separation, which, in turn, enables to limit the bottom temperature. A diluted hydrogen peroxide solution is fed at the middle of the column through the inlet pipe (2). Consequently, the upper half of the column (33) acts as an enriching zone, while the lower part of the column (4) acts as a stripping zone, which reduces the energy requirement and the inventory (liquid hold-up) requirement of the process.

The top vapors are sent to a condenser (6) through a pipe (5). The resulting liquid and vapors are sent to a liquid/vapor separator (8) through a pipe 7. Part of the recovered liquid is refluxed to the top of the column (1) through a pipe (9).

The highly boiling liquid fraction obtained at the bottom of the distillation column (1) is continuously transferred to the falling film evaporator (11) by means of a distributor (10). The use of a falling film evaporator according to the invention reduces the residence time of concentrated hydrogen peroxide at high temperature and so, minimises the risk of explosive decomposition. It also ensures a dispersion of the liquid on a surface instead of a bulk form, which minimises the probability of a detonation. Finally, it minimises the temperature rise during evaporation, which minimises the risk of explosive decomposition. The use of gravity flow avoids the risk of frictional heating as an initiation source of explosive decomposition.

The concentrated solution obtained at the bottom of the falling film evaporator (11) is transferred via a pipe (12) to a vapor/liquid separator (13). The vapors are sent back to the bottom of the column via a pipe (14). The final liquid product is continuously transferred via a pipe (15) to a falling film cooler (16) which allows an optional heat transfer coefficient and a minimum liquid hold-up.

This cooler (16) can use ethylene glycol as a refrigeration medium, and has preferably a countercurrent configuration.

The cooled final product is evacuated through a pipe (17).

EXAMPLE 1

Fabrication of a Diluted Hydrogen Peroxide Solution

A 35–42% $H_2O_2$ solution is fed to the first distillation operation at the bottom of a distillation column containing 3–5 theoretical trays.

This column is operated at a base temperature of 57–74° C. (135–165° F.) and overhead temperature of 43–60° C. (110–140° F.), base pressure 0.075–0.15 bar (30–60 inches of water) and reflux ratio 0.25–0.35.

The distillate is diluted with ultra-pure water to a concentration of 45–49%. It is then distilled again in a glass distillation column to a concentration of 50–74% $H_2O_2$ w/w. The glass distillation column is a packed column with 2–4 theoretical trays and is operated at 57–69° C. (135–157° F.), base pressure 0.05–0.11 bar (20–43 inches of water) and reflux ratio 0.05–0.12.

The final hydrogen peroxide solution has approx. 10–20% of the TOC of the feed, 0.1%–1% of the anions and approx. 0.5–2% of the cations.

EXAMPLE 2

Fabrication of a Concentrated Hydrogen Peroxide Solution According to the Invention An apparatus as described in FIG. 1 (except for the cooler, which is a coil surrounded by a jacket instead of a falling film cooler), has been used for the production of a 96% w/w hydrogen peroxide solution according to the following steps: A 86% w/w solution is fed at the middle of a packed distillation column containing 4–5 theoretical plates.

The distillation column has an inner diameter of 75 mm in the packing section and a total height of 1.42 m. It is operated at a temperature of about 40° C. at the bottom, and about 18° C. at the top, under a vacuum of 8–10 mbar, with a reflux ratio of 1:1.

The high boiling fraction of the solution is transferred to a falling film evaporator by means of a distributor.

The falling film evaporator consists of a single jacketed tube having a diameter of about 25 mm and a total height of 750 mm. Water at 65° C. is circulating in the jacket. At the bottom of the falling film evaporator, there is a cooler which consists of a coil surrounded by a jacket which is cooled by water.

For a feed of about 360 g/h, the production was of about 300 g/h of the 96% w/w hydrogen peroxide solution.

What is claimed is:

1. A process for the concentration of a diluted solution containing a solvent, said process comprising the following steps:

(a) feeding the diluted solution at least at one point along a distillation column;

(b) distilling the diluted solution in the distillation column so as to obtain a low boiling vapor fraction of the solution at the top of the distillation column and a high boiling liquid fraction of the solution at the bottom of the distillation column;

(c) transferring, through a first distributor, the high boiling liquid fraction of the solution from the bottom of the distillation column into a falling film evaporator;

(d) concentrating the high boiling liquid fraction of the solution in the falling film evaporator by evaporation of at least part of the solvent; and (e) collecting a concentrated solution at the bottom of the falling film evaporator; and (f) transferring the concentrated solution from the falling film evaporator through a second distributor into a cooler where it is cooled;

wherein the distillation column and the falling film evaporator constitute two distinct pieces of equipment which are easy to dismantle and to transport separated by the first distributor, and the distillation column is assembled on top of the falling film evaporator.

2. The process according to claim 1, wherein the distillation is carried out under a maximum pressure of 10 Torr.

3. The process according to claim 1, in which the concentrated solution is a concentrated aqueous hydrogen peroxide solution.

4. The process according to claim 3, in which the concentrated solution leaving the falling film evaporator contains at least 90% w/w hydrogen peroxide.

5. The process according to claim 1, in which the axes of the distillation column and the falling film evaporator are aligned.

6. The process according to claim 1, in which the first distributor has a cross-sectional area at its narrowest point which is smaller than the cross-sectional area of the distillation column.

7. The process according to claim 1, in which the distillation column and the falling film evaporator are assembled in a way that allows the high boiling liquid fraction to flow from the distillation column to the falling film evaporator through the distributor under the action of gravity alone.

8. The process according to claim 1, in which the falling film evaporator consists of a single tube surrounded by a jacket and hot water is circulating in the jacket to heat the tube.

9. The process according to claim 8, in which the hot water in the jacket and the high boiling liquid fraction in the tube are flowing down concurrently.

* * * * *